3,449,108
METHOD OF INHIBITING POSTHARVEST DETERIORATION OF HARVESTED PLANTS
William C. McConnell, Atlanta, Ga., and Henry W. Rahn, Pittsburgh, Pa., assignors to PPG Industries, Inc., a corporation of Pennsylvania
No Drawing. Continuation-in-part of applications Ser. No. 358,121, Apr. 7, 1964, Ser. No. 400,216, Sept. 29, 1964, and Ser. No. 605,200, Dec. 28, 1966. This application Aug. 8, 1967, Ser. No. 659,033.
Int. Cl. A01n *3/00;* A23k *3/00*
U.S. Cl. 71—68
8 Claims

ABSTRACT OF THE DISCLOSURE

Potassium or sodium azide is applied to harvested agricultural produce such as fruits, grains, vegetables, or flowers to inhibit postharvest deterioration. The azide may be dusted on the plant as dry powder or it may be applied in solution.

Related applications

This application is a continuation-in-part of Ser. No. 605,200, filed Dec. 28, 1966, now Patent No. 3,376,126, which is a continuation of Ser. No. 358,121, filed Apr. 7, 1964, now abandoned, which discloses the use of potassium azide to inhibit postharvest deterioration of edible plant parts and of Ser. No. 400,216, filed Sept. 29, 1964, now Patent No. 3,376,125 which discloses the use of sodium azide for that purpose.

Prior art

Wessenberg, U.S. Patent 1,819,399, discloses the use of the salts of hydrazoic acid for combatting animal and vegetable pests. The patent fails to suggest using either potassium or sodium azide to treat harvested edible plant products, however.

Disclosure

This invention relates to potassium and sodium azides. More specifically, this invention relates to the use of these azides to inhibit postharvest deterioration of harvested edible plant parts.

Potassium and sodium azides are both crystalline solids which are readily soluble in water. They are stable at all temperatures up to their melting points (350° C. and 300° C., respectively). Aqueous solutions of either azide, ranging from the most dilute to saturated are also very stable. Solutions containing 250 grams of potassium azide (or sodium azide) in 750 grams of water, for example, have been stored in sealed containers at room temperature for periods in excess of a year without significant decomposition.

A spray or dip of either potassium or sodium azide on harvested fruit or vegetables is effective in inhibiting or preventing postharvest deterioration. The deterioration inhibited by this treatment includes rot, typically caused by fungi and/or soil micro-organisms, e.g., bacteria, sprouting, budding, and the natural results of continued respiration or enzyme activity in the harvested plant product. Thus, for example, when a sugar beet is dipped in an aqueous solution containing about 1/10 to about 5 percent potassium azide, the respiration of the sugar beets is inhibited. Because respiration of a sugar beet normally consumes sugar, the sugar content of a beet where respiration is thus inhibited is maintained at a high level. Within a relatively short period, rarely in excess of a week, the potassium azide on the surface of the beet decomposes so that the sugar beet is fit for human consumption. A similar treatment of potatoes retards the conversion of starch into undesirable sugar by substantially reducing the enzyme activity of the potato. Although the toxicity of potassium azide is dissipated when the potassium azide decomposes, the effect of the azide on the biological processes of the harvested plant parts usually extends beyond the life of the azide. Often these effects are permanent. Sodium azide may be employed in the same manner as potassium azide.

The azides of this invention are very soluble in water. Thirty-one percent potassium azide by weight or twenty-eight percent sodium azide by weight, basis the solution, may be dissolved in water at 10° C. At 40° C. solutions containing up to 50 percent by weight potassium azide, basis the solution, are conveniently prepared. Solutions of either azide may be stored and used in vessels of mild steel, stainless steel, and or nickel, for example, for time periods normally required in agricultural practice without significant reaction between the azide solution and the material of the container. Thus in the practice of the present invention, the azide is often conveniently applied, as aqueous spray or dip to harvested roots, tubers, seeds, berries, flowers, fruits, etc. The solutions may contain any convenient concentration of azide, usually less than about 10 percent by weight. Other methods of application are within the scope of this invention. For example, either azide may be ground to a very fine powder size, e.g., minus 100 mesh and applied as a dust. It is often desirable to dilute the azide with an inert diluent such as silica, clay, talc, bentonite, diatomaceous earth, wood flour, etc. Good distribution of the azide is usually facilitated by diluting the azide with up to in excess of 99 percent inert dust. Sometimes formulations containing about 5 to about 25, rarely in excess of 30 percent, azide are useful.

The following examples are further illustrative of the invention:

Example I

A number of Elberta peaches were dipped in an aqueous slurry of brown rot (monolinia), decayed peach pulp. The peaches were allowed to air dry after which they were treated by immersing them for three minutes each in the various dips listed in Table 1. Four peaches were immersed in each dip. After being dipped, the peaches were placed on paper towels and allowed to stand in the open at 70–80° F. Results are reported in Table 1.

TABLE 1

| Dip: | Condition four days after dip |
|---|---|
| Water | 3 of 4 peaches badly rotted. |
| KN$_3$ in water, ½% | All peaches clean. No skin effect. |
| KN$_3$ in water, 1% | All peaches clean. Slight skin discoloration. |
| KN$_3$ in water, 2% | All peaches clean. Severe skin discoloration. |

Infection of a fruit crop often occurs during processing and packaging. The foregoing example shows that azide treatment during processing should considerably reduce spoilage from pathogens picked up by the fruit. The persistence of the azide on the fruit is very short. Thus, the treated fruit is suitable for consumption soon after treatment. Grapes, peaches, oranges, bananas and other fruits may be conveniently sprayed with solutions containing less than 0.05, normally less than about 1 percent azide in the processing line. If desired, effective amounts of other chemical agents, e.g., propynyl N-phenylcarbamate, propynyl N-(3-chlorophenyl)carbamate, isopropyl thionocarbamate, 2-cyanoethyl N-phenylcarbamate, isopropyl N-phenylcarbamate, isopropyl N-(3-chlorophenyl)carbamate, 2,4-dichlorophenoxyacetic acid and its esters, 4(2,4-dichloropenoxybutyric) acid and its esters, trichloroacetic acid and its salts, alkyl alcohol or other compatible chemicals with fungicidal or bactericidal activity may be included in the spray or dip. Wetting agents may be included in the formulation in accordance with accepted practice, if desired.

Example II

Quart baskets, about ⅔ full, of Albritton strawberries, were dipped four times in rapid sucession in the aqueous dips shown in Table 2. After draining, the baskets were exposed on a bench by an open window. Two baskets were dipped in tap water for a check. Two baskets were dipped in each mixture. The table reports the condition of the berries 96 hours after dipping. The amount of carbamate or other coagent in the dip should normally be small, e.g., less than about 1 percent by weight. Higher concentrations may damage the plant part being treated.

TABLE 2

| Percent | Percent $KN_3$ by weight | | |
|---|---|---|---|
| | 0.0 | 0.1 | 0.2 |
| Propynyl N-phenyl-carbamate by weight. | 0.0 Heavy growth of gray mold rot. | | |
| | 0.2 | Good | Good. |
| | 0.3 | Slight fungi | Fair. |
| | 0.4 | do | Injured. |

Example III

A solution containing 9 parts per million by weight $NaN_3$ in water was prepared. Fresh cut carnation flowers were dipped into the solution and air dried. The treated flowers remained fresh much longer than flowers which had not been treated with the azide solution.

Potassium azide is generally preferred to sodium azide in practice.

The invention may be practiced in many ways. It is not intended to limit the invention by reference to details of the specific embodiments described.

We claim:
1. A method of inhibiting postharvest deterioration of harvested plant parts which comprises applying an effective amount of potassium azide to said harvested plant parts.
2. The method of claim 1 wherein the harvested plant part is contacted with an aqueous solution containing potassium azide.
3. The method of claim 2 wherein the solution contains from about 0.5 to about 10 percent by weight $KN_3$.
4. The method of claim 3 wherein the solution contains less than about 1 percent by weight $KN_3$.
5. A method of inhibiting postharvest deterioration of harvested plant parts which comprises applying an effective amount of sodium azide to harvested plant parts selected from the group consisting of roots, tubers, vegetables, berries, flowers and fruits.
6. The method of claim 5 wherein the harvested plant part is contacted with an aqueous solution containing sodium azide.
7. The method of claim 6 wherein the solution contains from about 0.5 to about 10 percent by weight sodium azide.
8. The method of claim 7 wherein the solution contains less than about 1 percent by weight sodium azide.

References Cited

UNITED STATES PATENTS 1,819,399   8/1931   Wesenberg.

RAYMOND N. JONES, *Primary Examiner.*

J. M. HUNTER, *Assistant Examiner.*

U.S. Cl. X.R.

99—153, 156, 222